US012223389B2

(12) United States Patent
Wang et al.

(10) Patent No.: US 12,223,389 B2
(45) Date of Patent: Feb. 11, 2025

(54) OPTICAL INFORMATION COLLECTOR AND METHOD THEREOF

(71) Applicant: WUXI IDATA TECHNOLOTY COMPANY LTD., Wuxi (CN)

(72) Inventors: Dongsheng Wang, Guangzhou (CN); Jiangtao Wei, Shenzhen (CN); Songlai Zhang, Shaoyang (CN); Xiaoqin Zhou, Shenzhen (CN)

(73) Assignee: WUXI IDATA TECHNOLOTY COMPANY LTD., Wuxi (CN)

( * ) Notice: Subject to any disclaimer, the term of this patent is extended or adjusted under 35 U.S.C. 154(b) by 0 days.

(21) Appl. No.: 18/413,108

(22) Filed: Jan. 16, 2024

(65) Prior Publication Data

US 2024/0152716 A1 May 9, 2024

Related U.S. Application Data

(63) Continuation of application No. PCT/CN2023/109637, filed on Jul. 27, 2023.

(30) Foreign Application Priority Data

Aug. 11, 2022 (CN) .......................... 202210959551.5

(51) Int. Cl.
*G06K 7/14* (2006.01)
*H04N 23/60* (2023.01)

(52) U.S. Cl.
CPC ........... *G06K 7/1473* (2013.01); *H04N 23/64* (2023.01)

(58) Field of Classification Search
CPC ............. G06K 7/1473; G06K 7/10722; G06K 7/10544; G06K 7/1404; H04N 23/64; Y02D 30/70
See application file for complete search history.

(56) References Cited

U.S. PATENT DOCUMENTS

| 4,949,391 | A | 8/1990 | Faulkerson |
| 7,566,008 | B1 * | 7/2009 | Shah ................... G06K 7/10881 |
| | | | 235/472.01 |
| 11,871,026 | B2 * | 1/2024 | Lee ....................... H04N 19/513 |

(Continued)

FOREIGN PATENT DOCUMENTS

| CN | 104992207 A | 10/2015 |
| CN | 106470321 A | 3/2017 |

(Continued)

*Primary Examiner* — Tuyen K Vo
(74) *Attorney, Agent, or Firm* — JEEN IP LAW, LLC

(57) ABSTRACT

The present application provides an optical information collector and a method thereof. The optical information collector includes an image sensor, configured to collect image data of optical information; a decoding unit, configured to decode the image data based on a preset decoding algorithm; a central processor, configured to control the image sensor to collect the image data and control the decoding unit to decode the image data upon triggering. Once triggered, the central processor issues an instruction to discard N frames of image data in a specific frame number, where the N frames of image data in a specific frame number is image data that was previously collected and remaining in the optical information collector upon triggering, which can prevent residual image data from being decoded and outputted, causing a decoding error, thereby improving a decoding efficiency.

15 Claims, 12 Drawing Sheets

(56) References Cited

U.S. PATENT DOCUMENTS

2008/0265035 A1* 10/2008 Vinogradov ....... G06K 7/10722
                                                                  235/462.41
2020/0287656 A1* 9/2020 Chu ................... H03M 13/1105
2022/0350982 A1* 11/2022 West .................... G06K 7/1417

FOREIGN PATENT DOCUMENTS

| | | | |
|---|---|---|---|
| CN | 109740393 | A | 5/2019 |
| CN | 106934318 | A | 3/2020 |
| CN | 113037989 | A | 6/2021 |
| CN | 115034247 | A | 9/2022 |
| CN | 115396572 | A | 11/2022 |
| CN | 115426442 | A | 12/2022 |
| JP | H11203392 | A | 7/1999 |
| WO | 2022141333 | A | 12/2020 |

* cited by examiner

OPTICAL INFORMATION COLLECTOR AND METHOD THEREOF

CROSS-REFERENCE TO RELATED APPLICATIONS

This application is a National Stage of International Application No. PCT/CN2023/109637, filed on Jul. 27, 2023, which claims priority to Chinese Patent Application No. 202210959551.5, filed on Aug. 11, 2022. Both of which are hereby incorporated by reference in their entireties.

TECHNICAL FIELD

The present application relates to the field of optical information collection technologies, and in particular, to an optical information collector and a method thereof.

BACKGROUND

Optical information collection based on image scanning includes collection of various machine-readable optical information. Common machine-readable optical information includes one-dimensional code, two-dimensional code, OCR (Optical Character Recognition) image and text, ultraviolet anti-counterfeiting code, infrared anti-counterfeiting code, etc.

Usually, supplementary light is required when collecting optical information to obtain a clear image. Traditional method of supplementing light is continuously supplementing light during a collection process of optical information, which results in severe equipment heating and high-power consumption.

The main inventors of the present application have developed a low-power supplementary light method disclosed in CN201810098421.0, and the entire content is hereby incorporated by reference. An optical imaging unit supplements light during an exposure time of a frame period, and turns off supplementary light during a sampling time of the frame period. By periodically turning on and off a fill light unit, a purpose of reducing power consumption is achieved.

The frame period of an optical imaging unit is usually within 50 ms. An excellent optical imaging unit can achieve a frame period of up to 20 ms, which means that the optical imaging unit can collect ten frames of images in just 1 second. The optical imaging unit usually continuously collects images in a digital stream mode, and successful recognizes optical information that usually comes from one frame of the image. When an optical information recognition is successful, the optical imaging unit will no longer continue to recognize subsequent collected images and stop collecting optical information.

However, when the optical information recognition is successful, the optical imaging unit continuously collects images in the digital stream mode. When the optical information is successfully recognized through one frame of the image, multiple frames of images have already been continuously collected, and the subsequent multiple frames of images are not used for optical information recognition, which results in waste of power consumption.

The main inventors of the present application further developed another low-power barcode scanning system and a method thereof disclosed in CN201811485945.1, and the entire content is hereby incorporated by reference. An image sensor is in a standby mode before being triggered, and after a decoding is successful or the decoding times out, the image sensor enters the standby mode again. This method is different from the mobile phone industry. After opening a camera application, the camera continuously collects and previews images, resulting in high power consumption. However, the mobile phone does not use the camera for a long time, and the power consumption issue can be ignored. The barcode scanning industry is different. The image sensor of barcode scanning needs to be used for a long time, and if it remains in an operation state, the battery life will significantly decrease.

However, this brings another issue. The inventors of the present application have found that when the image sensor continuously collects images in the digital stream mode, if the control image sensor suddenly interrupts image acquisition after successful decoding or decoding timeout (at this time, the device is still powered on, the image sensor is still powered on, but it does not output and preview images, thus saving power), as previously mentioned, the image sensor may have already collected images, although this is a probabilistic event, it can also cause certain adverse effects, and collected images will not continue to be outputted, but stored (residual) in a storage area of the image sensor (some image sensors are equipped with a separate buffers, and the image will be residual in the buffer; for image sensors without a separate buffer, electrical signal of the image will be residual in a PN junction of a pixel unit of the image sensor). When the image sensor collects a next image, the residual image will be first outputted.

The inventors also found through research that certain platforms using Qualcomm or MediaTek may not only retain images in the image sensor, but may also retain images in other memories, such as a buffer of the image signal processor.

New technologies need to be developed to address the aforementioned issues.

SUMMARY

A purpose of the present application is to provide an optical information collector and a method thereof for avoiding a decoding error and thereby reducing power consumption.

To achieve the above purpose, the following technical means are adopted in the present application.

The present application provides an optical information collector, including an image sensor, configured to collect image data of optical information; a decoding unit, configured to decode the image data based on a preset decoding algorithm; a central processor, configured to control the image sensor to collect the image data and control the decoding unit to decode the image data upon triggering, where once triggered, the central processor issues an instruction to discard N frames of image data in a specific frame number, where the N frames of image data in a specific frame number is image data that was previously collected and remaining in the optical information collector upon triggering.

In an embodiment of the present application, N frames of image data in a specific frame number include residual image data in a storage area of the image sensor.

In an embodiment of the present application, the optical information collector further includes an image signal processor, configured to receive the image data collected by the image sensor and transmit the image data to the decoding unit, where the N frames of image data in a specific frame number includes residual image data in the image signal processor.

In an embodiment of the present application, the discarding N frames of image data in a specific frame number includes: the decoding unit does not receive the N frames of image data in a specific frame number, or the decoding unit does not decode the N frames of image data in a specific frame number, or the decoding unit does not output or display decoding information of the N frames of image data in a specific frame number.

In an embodiment of the present application, the decoding unit starts decoding from N+1st frame of image data.

The present application provides an optical information collection method, including: controlling an image sensor to collect and output image data by a central processor upon triggering; receiving the image data and issuing an instruction to discard N frames of image data in a specific frame number by the central processor, where N frames of image data in a specific frame number is image data that was previously collected and remaining in the optical information collector upon triggering; decoding the image data by a decoding unit.

In an embodiment of the present application, N frames of image data in a specific frame number include residual image data in a storage area of the image sensor.

In an embodiment of the present application, receiving the image data collected by the image sensor through an image signal processor, transmitting the image data to the decoding unit by an image signal processor; the N frames of image data in a specific frame number includes residual image data in the image signal processor.

In an embodiment of the present application, the discarding N frames of image data in a specific frame number includes: the decoding unit does not receive N frames of image data in a specific frame number, or the decoding unit does not decode N frames of image data in a specific frame number, or the decoding unit does not output or display decoding information of the N frames of image data in a specific frame number.

In an embodiment of the present application, the decoding unit starts decoding from N+1st frame of image data.

The present application provides an optical information collector, including: an image sensor, configured to collect image data of optical information; a decoding unit, configured to receive and decode the image data; a central processor, configured to control the image sensor to collect the image data and control the decoding unit to decode the image data; where the central processor is configured to control the image sensor to collect and output a fixed frame number of image data in a fixed frame mode and control the decoding unit to decode the image data upon triggering, stop decoding residual image data in the fixed frame number of image data when one frame of image data is successfully decoded.

In an embodiment of the present application, the fixed frame mode includes: when the decoding unit decodes successfully but the image sensor has not collected the fixed frame number of image data, the image sensor will continue to collect the fixed frame number of image data and output the fixed frame number of image data.

In an embodiment of the present application, the fixed frame mode includes: controlling the decoding unit to sequentially receive and decode the fixed frame number of image data by the central processor, controlling the image sensor to collect a fixed frame number of image data again when or before a last frame of image data in the fixed frame number of image data is not successfully decoded.

In an embodiment of the present application, the optical information collector does not include an image signal processor or does not optimize the image data collected by the image sensor through the image signal processor.

In an embodiment of the present application, the image sensor is configured to collect the image data in the following order: collecting the image data in a fixed frame mode with a preset number of times, and continuously collecting the image data in a digital stream mode.

The present application provides an optical information collection method, including: controlling an image sensor to collect and output a fixed frame number of image data in a fixed frame mode by a central processor upon triggering; receiving and decoding the image data by a decoding unit, and stopping decoding residual image data in the fixed frame number of image data when one frame of image data is successfully decoded.

In an embodiment of the present application, when the decoding unit decodes successfully but the image sensor has not collected the fixed frame number of image data, the image sensor will continue to collect a fixed frame number of image data and output the fixed frame number of image data.

In an embodiment of the present application, the central processor controls the decoding unit to sequentially receive and decode the fixed frame number of image data, and controlling the image sensor to collect a fixed frame number of image data again when or before a last frame of image data in the fixed frame number of image data is not successfully decoded.

In an embodiment of the present application, the optical information collection method does not include an image signal processor or does not optimize the image data collected by the image sensor through the image signal processor.

In an embodiment of the present application, the image sensor is configured to collect the image data in the following order: collecting a fixed frame number of image data in a fixed frame mode with a preset number of times, and continuously collecting the image data in a digital stream mode.

The present application provides an optical information collector, including: an image sensor, configured to collect image data of optical information; a memory, configured to preset with one or more decoding algorithms; a decoding unit, configured to receive and decode the image data; a central processor, configured to control the image sensor to continuously collect the image data in a digital stream mode and control the decoding unit to sequentially decode the image data; where the central processor is configured to control the image sensor to stop continuously collecting the image data in the digital stream mode and control the image sensor to continue collecting and outputting a fixed frame number of image data when the decoding unit decodes successfully or a decoding times out.

In an embodiment of the present application, the optical information collector does not have an image signal processor or does not optimize the image data through the image signal processor.

In an embodiment of the present application, the image sensor outputs image data in RAW format, the decoding unit obtains image data in grayscale based on the image data in RAW format and decodes based on the image data in grayscale.

In an embodiment of the present application, the fixed frame number of image data is one or two frames.

In an embodiment of the present application, the image data collected by the image sensor is directly transmitted to the decoding unit for decoding.

The present application provides an optical information collection method, including: controlling an image sensor to continuously collect and output image data in a digital stream mode by a central processor; receiving and decoding the image data by a decoding unit; controlling the image sensor to stop collecting the image data in the digital stream mode when the decoding unit decodes successfully; controlling the image sensor to continue collecting and outputting the image data.

In an embodiment of the present application, the optical information collector does not have an image signal processor or does not optimize the image data through the image signal processor.

In an embodiment of the present application, the image sensor outputs image data in RAW format, the decoding unit obtains image data in grayscale based on the image data in RAW format and decodes based on the image data in grayscale.

In an embodiment of the present application, the fixed frame number of image data is one or two frames.

In an embodiment of the present application, the image data collected by the image sensor is directly transmitted to the decoding unit for decoding.

REFERENCE NUMBER

Figure 1:
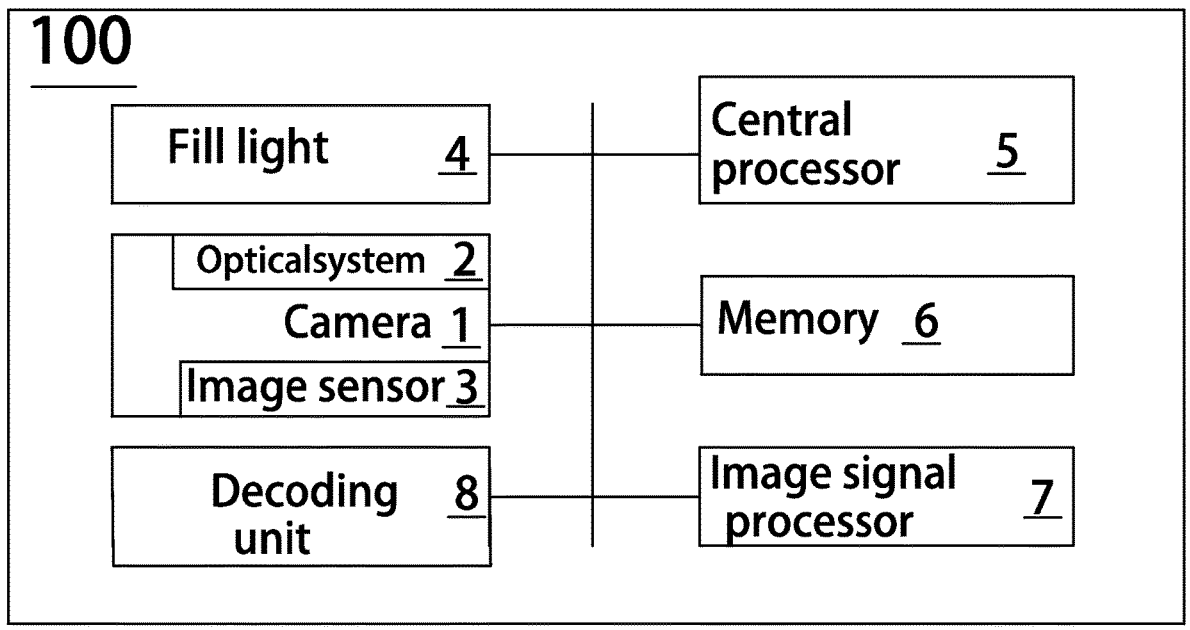
FIG. 1 is a simplified block diagram of an optical information collector in an embodiment of the present application.

Optical information collector 100; Camera 1; Optical system 2; Image sensor 3; Fill light 4; Central processor 5; Memory 6; Image signal processor 7; Decoding unit 8; Shell 9; Scanning window 10; Display screen 11; Button 12; Storage area 13; Register 14; Buffer 15.

DESCRIPTION OF EMBODIMENTS

In order to facilitate a better understanding of the purpose, structure, features, and efficacy of the present application, further explanation is provided in combination with the drawings and specific implementation modes.

Referring to FIG. 1, a simplified block diagram of an optical information collector 100 of an embodiment is shown. As further elaborated below, the optical information collector 100 can be used to collect one or more types of optical information, such as one-dimensional code, two-dimensional code, OCR graphics, ultraviolet anti-counterfeiting code, infrared anti-counterfeiting code, etc.

The optical information collector 100 may include at least one camera 1, which may include a combination of an optical system 2 (lens) for capturing light and an image sensor 3 (sensor) for photoelectric conversion of the light captured by the optical system 2. The optical system 2 may include one or more reflectors, prisms, lenses, or a combinations thereof, and the image sensor 3 may also be provided with be one or more, it can be one image sensor 3 corresponding to one/one set of optical systems 2, or multiple image sensors 3 can share the same/one set of optical systems 2, or multiple/multiple sets of optical systems 2 can share the same image sensor 3. The image sensor 3 can be a CCD (Charge Coupled Device), CMOS (Complementary Metal-Oxide-Semiconductor), or other type of image sensor 3, which is configured to convert a light signal into an electrical signal and output a digital signal of image data.

The optical information collector 100 may include one or more fill lights 4, which are configured to illuminate optical information when the camera 1 captures image data. Of course, under a suitable ambient lighting condition, it is possible not to use the fill light 4 for supplementing light, or the optical information collector 100 may not have the fill light 4. The fill light 4 can have various forms of supplementing light: for example, the fill light 4 continuously supplements light when the camera 1 collects optical information; or the fill light 4 can supplement light synchronized with an exposure time of the image sensor 3 of the camera 1. Chinese patent of CN201810098421.0 discloses a technical solution for synchronous supplementary light of a fill light 4 with an exposure time of an image sensor 3, and the entire content is hereby incorporated by reference. The fill light 4 can also be a pulse type of fill light, with a pulse time thereof overlaps with a portion of the exposure time of the image sensor 3.

The optical information collector 100 may further include a central processor 5 for executing various instructions.

The optical information collector 100 may further include a separate or integrated memory 6, which presets with one or more decoding algorithms as needed. The memory 6 may also store other programs or instructions. The memory 6 may include one or more non-transient storage media, such as fixed or movable volatile and/or non-volatile memory. Specifically, the memory 6 can be configured to store information, data, applications, instructions, and the like to enable processing modules to perform various functions according to exemplary embodiments of the present application. For example, the memory 6 can be configured to buffer input data for processing by a central processor 5. Alternatively, or alternatively, the memory 6 can be configured to store instructions executed by the central processor 5. The memory 6 can be considered as a main memory and included in a volatile storage device such as a RAM (Random Access Memory) or other forms, where the volatile storage device only maintains its content during an operation process, and/or the memory 6 can be included in the non-volatile storage device such as a ROM, an EPROM (erasable programmable read-only memory), an EEPROM (Electrically Erasable Programmable read only memory), a FLASH, or other types of storage devices that maintain memory content independent of a power state of the processing module. The memory 6 can also be included in an auxiliary storage device that stores large amounts of data, such as an external disk storage. In some embodiments, the memory may communicate with the central processor 5 via a data bus or other routing components using input/output components. The auxiliary storage may include a hard drive, a compact disk, a DVD (Digital Video Disc), a storage card, or any other type of high-capacity storage known to those skilled in the art. The memory 6 may store one or more of processes or methods of various optical information collecting, transmission, processing, and decoding to be described next.

The optical information collector 100 may further include an image signal processor 7 (ISP for short), which is configured to optimize the image data collected by the camera 1. The optimization process includes one or more of linear correction, noise removal, bad point correction, color interpolation, white balance correction, exposure correction, etc., to optimize the quality of the image data. For optical information that does not require color recognition, some or all the optimization processes mentioned above, such as color interpolation, are not necessary. The image signal processor 7 can process one frame of image data at a time through a single-core and single-thread, or it can process multiple frames of image data simultaneously through multi-cores and multi-threads. In an implementation mode, the optical information collector 100 may not have an image signal processor 7 or may not optimize the image data through the image signal processor 7.

The optical information collector 100 may further include a decoding unit 8, which is configured to decode the image data collected by the camera 1 according to a preset decoding algorithm, thereby identifying optical information, such as identifying encoding information of one-dimensional or two-dimensional code, identifying OCR images and text, or identifying encoding information of various ultraviolet/infrared anti-counterfeiting codes. The decoding unit 8 can decode one frame of image data at a time in a single-core and single-thread, or the decoding unit 8 can simultaneously decode multiple frames of image data in multi-core and multi-thread.

In an implementation mode, some or all functional modules of the image signal processor 7 can be integrated into the central processor 5, as disclosed in Chinese patent of CN201811115589.4, which includes a central processor 5 integrated with an image signal processor 7. The entire content is hereby incorporated by reference; in an implementation mode, some or all functional modules of the image signal processor 7 may be integrated into the image sensor 3; in an implementation mode, the decoding unit 8 can also be integrated into the central processor 5; in an implementation mode, the memory 6 can also be integrated into the central processor 5. In the following embodiments, when optimizing the image data through the image signal processor 7, the image signal processor 7 and decoding unit 8 are preferably integrated into the central processor 5, thereby saving costs; of course, the image signal processor 7 and the decoding unit 8 may not be integrated into the central processor 5.

Figure 2:
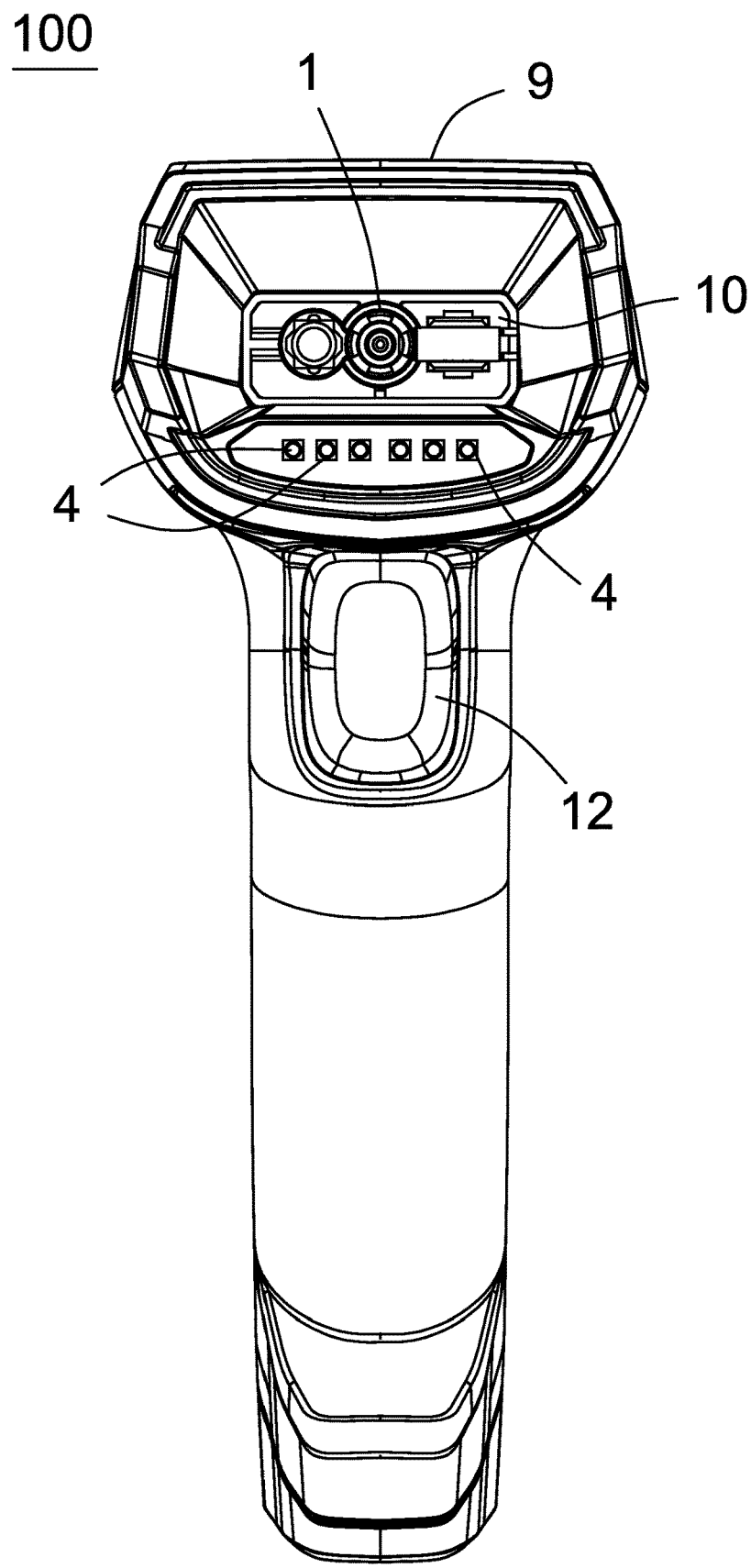
FIG. 2 is a schematic diagram of the optical information collector in an embodiment of the present application.
Figure 3:
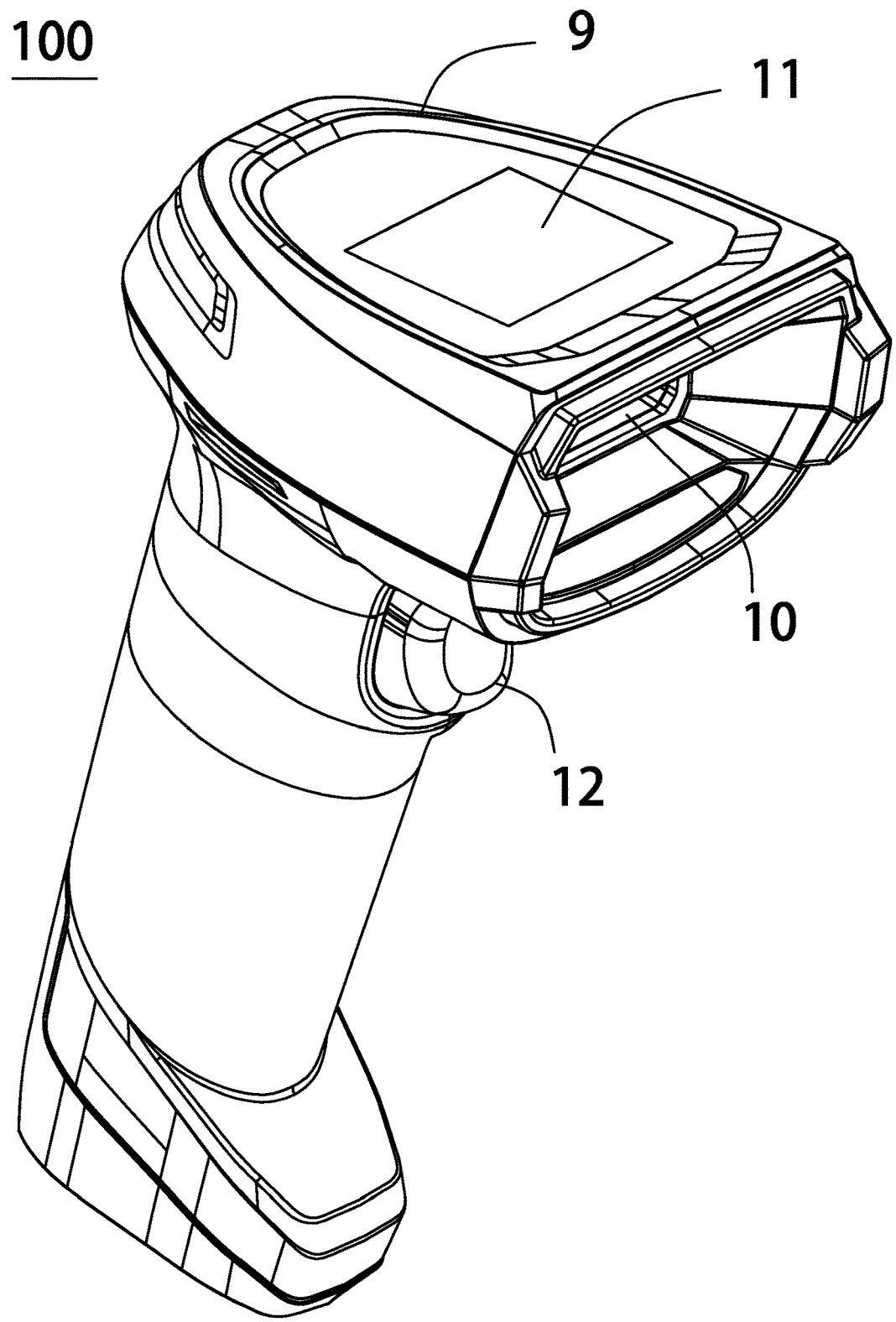
FIG. 3 is a three-dimensional view of the optical information collector in FIG. 2.

A schematic diagram of a handheld terminal as a specific embodiment of the optical information collector 100 is shown in FIGS. 2 and 3, the handheld terminal includes a shell 9, a display screen 11, and a button 12. A front end of the shell 9 is provided with a scanning window 10, and the camera 1 is housed in the shell 9, and optical information can be collected through the scanning window 10. In an implementation mode, the optical information collector 100 may not have a display screen 11, but instead output information to a separate display screen 11 for display. In an implementation mode, the optical information collector 100 can be a fixed, desktop, or other form of terminal, and can also be integrated as part of other devices.

The central processor 5 issues a triggering instruction through an external trigger, the external trigger can be triggered by a user pressing a specific button 12 or touching a specific area of the display screen 11, or by the user operating the optical information collector 100 through a specific gesture. Once the central processor 5 is triggered externally, a triggering instruction is issued according to a preset algorithm, which in turn triggers the image sensor 3 to collect the image data.

Figure 4:
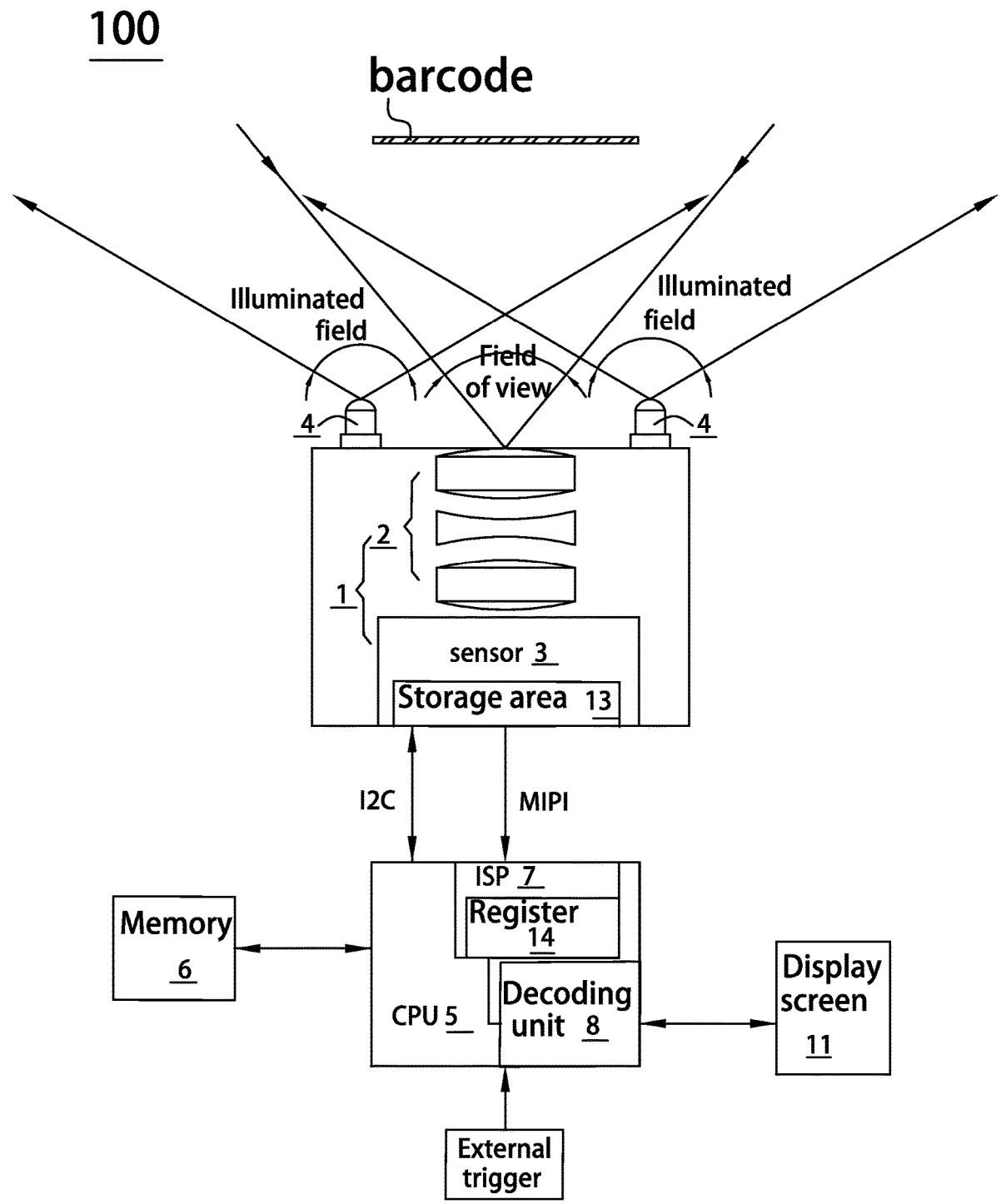
FIG. 4 is another block diagram of the optical information collector in an embodiment of the present application.

Where, the image data collected by the image sensor 3 can also be optimized and processed by the image signal processor 7, and then outputted to the decoding unit 8 for decoding. In a specific embodiment shown in a block diagram of FIG. 4, the optical information collector 100 collects a barcode. The user presses the button 12 to trigger the fill light 4 to supplement light and the image sensor 3 to collect the image data. The image signal processor 7 can sequentially receive and optimize the image data collected by the image sensor 3 through a MIPI interface (Mobile Industry Processor Interface), the decoding unit 8 decodes the image data transmitted by the image signal processor 7 after optimization processing. When one frame of image data is successfully decoded, the decoding unit 8 will stop decoding and inform the central processor 5 that decoding is successful. The central processor 5 issues an instruction to control the image sensor 3 to stop collecting the image data.

The image sensor 3 can continuously collect the image data in a digital stream mode, the digital stream mode means that according to a preset algorithm, the image sensor 3 will continuously collect the image data within a preset time. The decoding unit 8 decodes continuously collected image data sequentially with a single-thread or simultaneously decodes continuously collected image data with multi-threads. When the decoding is successful or the decoding times out, the image sensor 3 is controlled to stop collecting the image data, and the decoding unit 8 is controlled to stop decoding. For example, if the preset time is five seconds, it means that the image sensor 3 will continuously collect the image data within five seconds. If the image data collected by the image sensor 3 within five seconds is not successfully decoded, the decoding will timeout; if one frame of the image data is successfully decoded, even if the time has not yet reached five seconds, the central processor 5 will control the image sensor 3 to stop collecting the image data and control the decoding unit 8 to stop decoding.

Figure 5:
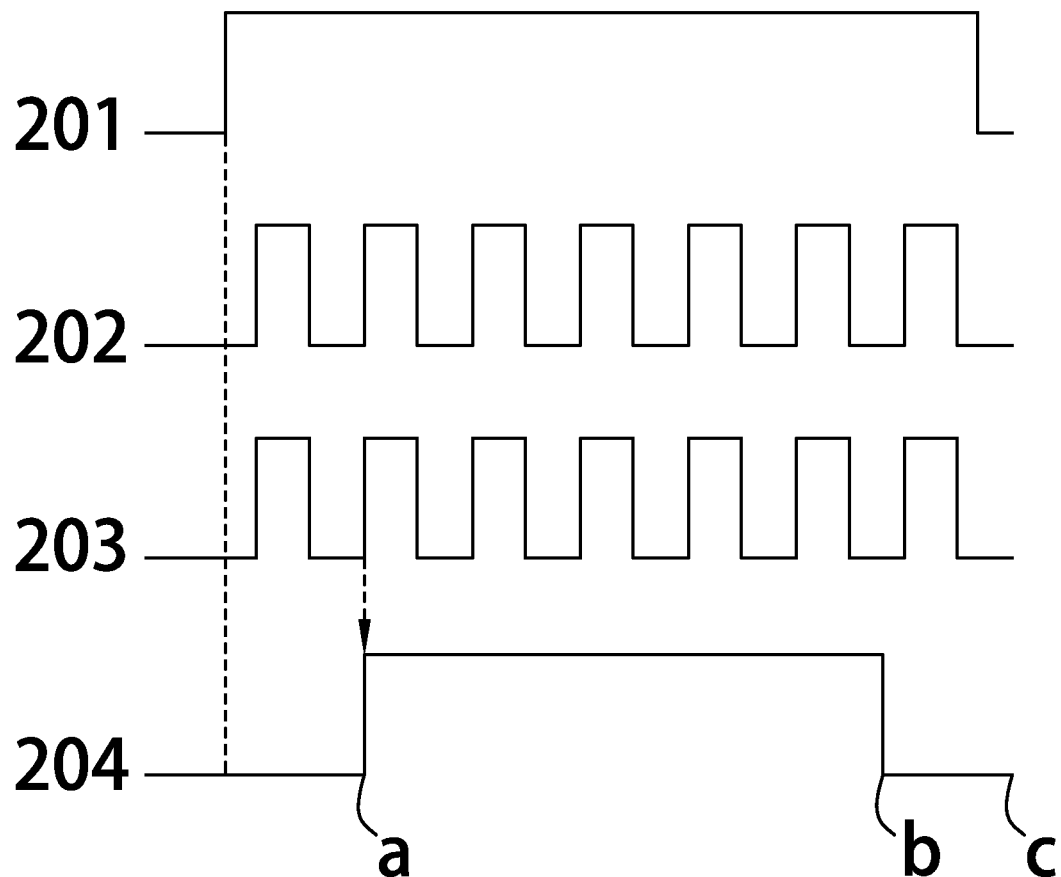
FIG. 5 is a timing diagram of the optical information collector collecting optical information in a digital stream mode of an embodiment of the present application.

As shown in FIG. 5, a timing diagram 200 of the optical information collector 100 collecting optical information in a digital stream mode of an embodiment is shown. The timing diagram 200 shows a triggering signal 201 triggered externally, a supplementary light timing 202 of the fill light 4, an image data collection timing 203 of the image sensor 3 continuously collecting the image data, and a decoding timing 204 of the decoding unit 8, where, the triggering signal 201 triggers the image sensor 3 to collect the image data and the fill light 4 to supplement light at a high level, and triggers the image sensor 3 to stop collecting the image data and the fill light 4 to stop supplementing light at a low level. The fill light 4 supplements light at the high level in the supplementary light timing 202 and closes supplementary light at the low level; the image data collection timing 203 of the image sensor 3 is synchronized with the supplementing light timing 202, and the image sensor 3 exposure at the high level in the image data collection timing 203 and outputs the image data at the low level. Dashed arrow in FIG. 5 represents a first frame of image data outputting to the decoding unit 8 for decoding. The decoding unit 8 receives the first frame of image data at time point a, successfully decodes the first frame of image data at time point b and feeds back successfully decoded information to the central processor 5. The central processor 5 controls the image sensor 3 to stop collecting the image data at time point c and controls the fill light 4 to stop supplementing light. Due to signal delay, a rising edge of the high-level of the trigger signal 201 is slightly earlier than a rising edge of the high-level of the image data collection timing 203, while a falling edge of the high-level of the triggering signal is slightly earlier than the time point c when the image sensor 3 ends collecting the image data. It should be noted that when an ambient light is sufficient, supplementary light is not necessary.

According to the timing diagram 200, it can be seen that when the decoding unit 8 decodes the image data, the image sensor 3 also collects new image data. When the first frame of image data is successfully decoded by the decoding unit 8, the image sensor 3 has already collected seven frames of image data, and the second to seventh frames of image data have not been transmitted to the decoding unit 8, instead, are stored (residual) in a storage area 13 (cache or a PN junction) of the image sensor 3 or a corresponding register 14 of the image signal processor 7. According to the first in, first out principle, the image data collected later will overwrite previously collected image data, and the seventh frame of image data will be stored in the register 14 of the image signal processor 7, while the sixth frame of image data will be stored in the storage area 13 of the image sensor 3, the second to fifth frames of image data are overwritten and cleared.

When the optical information collector 100 is triggered again to collect new optical information, the decoding unit 8 will first receive and decode the image data remaining in the storage area 13 of the image sensor 3 or the register 14 of the image signal processor 7, which will inevitably lead to a decoding error because the last residual image data is not image data of a new optical information.

The above problems can be solved by the following methods to avoid the decoding error.

Figure 6:
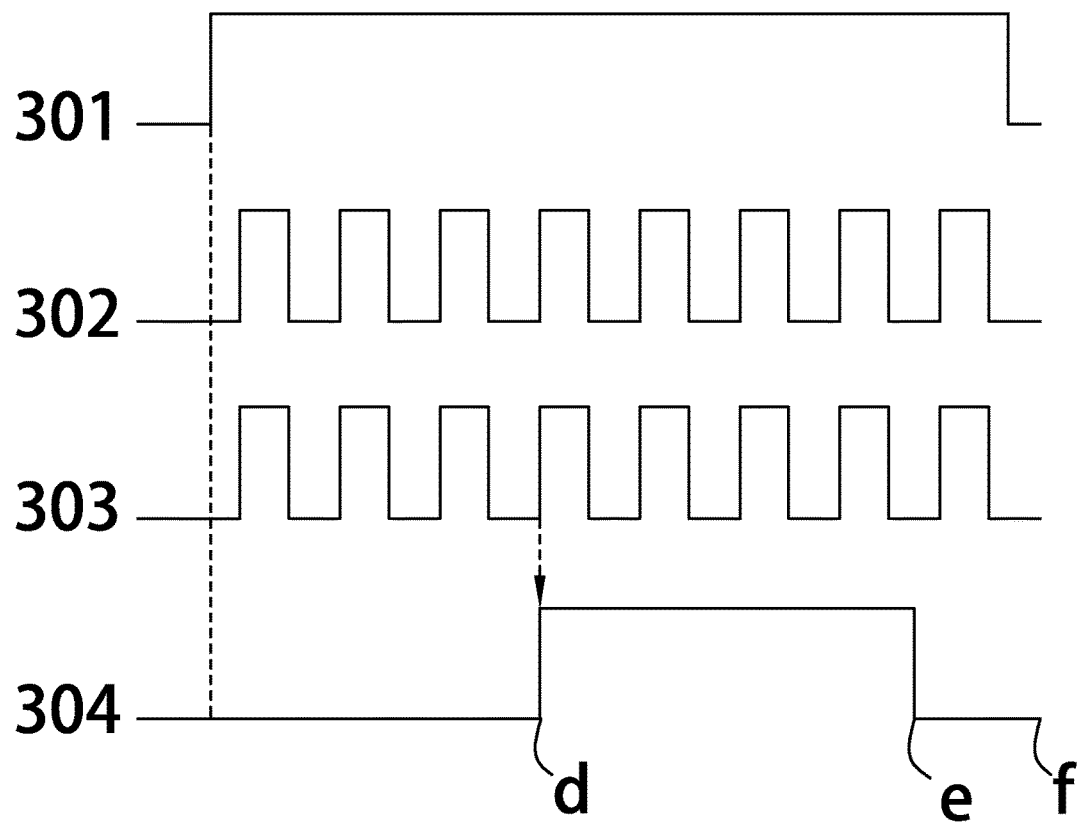
FIG. 6 is the timing diagram of the optical information collector collecting optical information of an embodiment of the present application.

An optional method, as shown in the timing diagram 300 in FIG. 6, discarding N frames of image data in a specific frame number and starting decoding from the N+1st frame of image data to avoid the decoding error, where N 1. The timing diagram 300 shows the triggering signal 301 triggered externally, the supplementary light timing 302 of the fill light 4, the image data collection timing 303 of the image sensor 3 continuously collecting the image data, and the decoding timing 304 of the decoding unit 8. Where, the triggering signal 301 triggers the image sensor 3 to collect the image data and the fill light 4 to supplement light at a high level and triggers the image sensor 3 to stop collecting the image data and the fill light 4 to stop supplementing light at a low level. The fill light 4 supplements light at the high level in the supplementary light timing 302 and closes supplementary light at the low level. The image data collection timing 303 of the image sensor 3 is synchronized with the supplementary light timing 302, and the image sensor 3 exposes at the high level of the image data collection timing 303 and outputs the image data at the low level. Due to one frame of image data remaining in the image sensor 3 and the image signal processor 7, a specific frame number N discarded is two frames. The first two frames of image data in image data collection timing 303 are not transmitted to the decoding unit 8. The dashed arrow in FIG. 6 represents the third frame of image data outputting to the decoding unit 8 for decoding. In the decoding timing 304, the decoding unit 8 receives and decodes the third frame of image data at time point d, at time point e, the third frame of image data is successfully decoded, and successfully decoded information is fed back to the central processor 5. Due to signal delay, at time point f, the image sensor 3 is controlled to stop collecting the image data and the fill light 4 is controlled to stop supplementing light. It should be noted that when the ambient light is sufficient, supplementary light is not necessary. According to the image data collection timing 302, it can be seen that at this time, the image sensor 3 has already collected eight frames of image data, and the eighth frame of image data will remain in the register 14 of the image signal processor 7. The seventh frame of image data will remain in the storage area 13 of the image sensor 3. When the optical information collector 100 is triggered to collect new optical information again, the optical information collector 100 will discard the residual two frames of image data in the image sensor 3 and the image signal processor 7 again and start decoding and outputting from the third frame of image data to avoid the decoding error.

It is easy to understand that if the specific frame N discarded is greater than or equal to the frame of the residual image data of the previous collected image data, it is sufficient, but not limited to two frames. For example, if the residual image data from the image sensor 3 and the image signal processor 7 is discarded, the specific frame number N is greater than or equal to two frames. Discarding residual image data may include that the decoding unit 8 does not receive residual image data, or the decoding unit 8 receives the residual image data but does not decode the residual image data, or the decoding unit 8 decodes the residual image data but does not output or display decoded information on a display screen 11, information that is outputted and displayed on display screen 11 is new optical information. For example, if it is known that the storage area 13 of the image sensor 3 and the register 14 of the image signal processor 7 respectively store the collected image data in a previous triggering, the first two frames of image data will be discarded in a next triggering of new optical information collection, and the third frame and subsequent image data will be taken as new optical information image data, and then the third frame and subsequent image data will be decoded, until decoding is successful or the decoding times out.

In one embodiment, the optical information collector 100 may not optimize the image data through the image signal processor 7. The image signal processor 7 only receives image data in RAW format transmitted by the image sensor 3, and then transmits the unoptimized image data to the decoding unit 8 for decoding. The decoding unit 8 directly receives image data in grayscale (only brightness signal of the image data in RAW format is taken), it is convenient for binary decoding of the image data, while the image signal processor 7 only serves as a simple data transmission channel, there is no residual image data in register 14 of the image signal processor 7; or the optical information collector 100 does not include an image signal processor 7, and the image data in RAW format collected by the image sensor 3 is directly transmitted to the decoding unit 8 through an interface such as a DVP (Digital Video Port) or a LVDS (Low Voltage Differential Signaling), then only one frame of image data remains in the storage area 13 of the image sensor 3. When collecting new optical information, only one frame of image data needs to be discarded, the second frame and subsequent image data are new optical information image data. The second frame and subsequent image data are decoded until decoding is successful or the decoding times out. Due to decoding optical information from the second frame, compared to the previous method of decoding optical information from the third frame, it saves processing time and time of supplementing light for one frame of image data, which can improve a decoding speed and reduce power consumption. In these specific embodiments, it is theoretically possible to save a certain amount of image data processing time by not optimizing the image data through the image signal processor 7.

Figure 7:
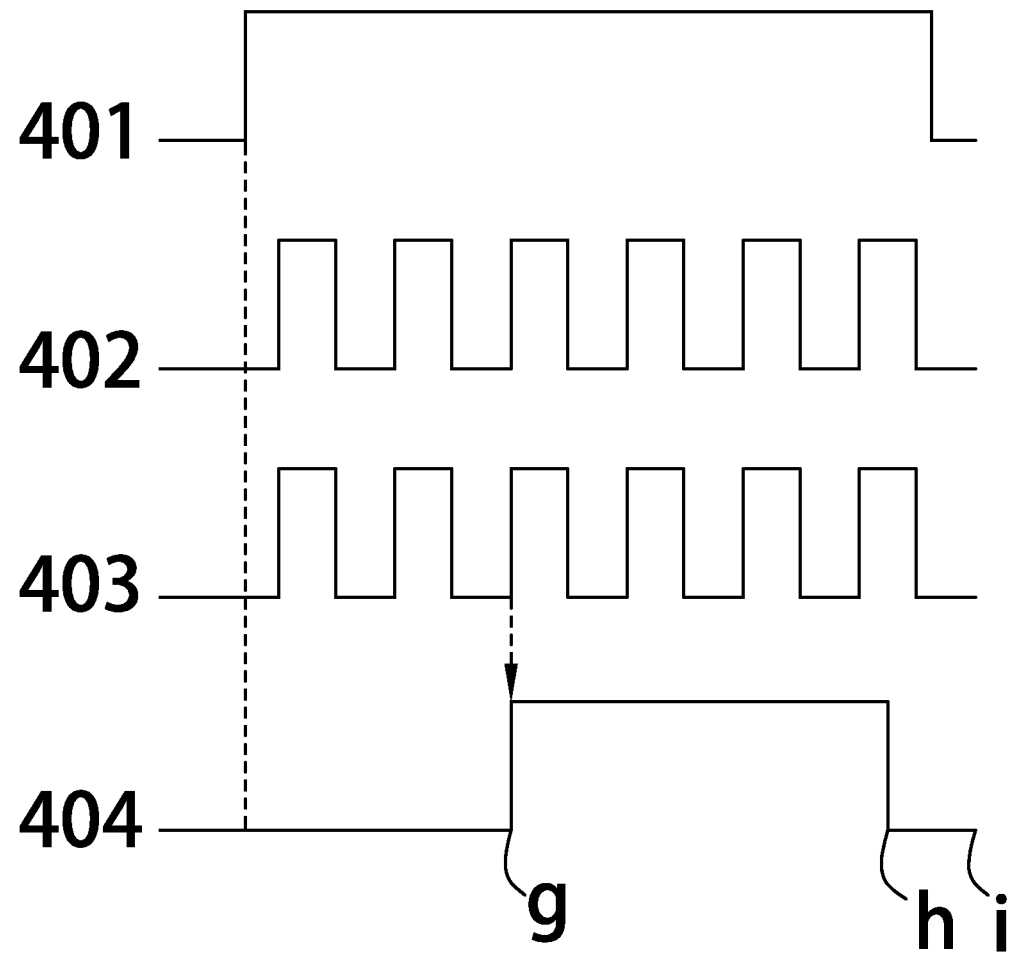
FIG. 7 is another timing diagram of the optical information collector collecting optical information of an embodiment of the present application.

Specifically, referring to the timing diagram 400 in FIG. 7, the triggering signal 401 triggered externally, the supplementary light timing 402 of the fill light 4, the image data collection timing 403 of the image sensor 3 continuously collecting the image data, and the decoding timing 404 of the decoding unit 8 are shown. Where, the triggering signal 401 triggers the image sensor 3 to collect the image data and the fill light 4 to supplement light at a high level and triggers the image sensor 3 to stop collecting the image data and the fill light 4 to stop supplementing light at a lower level. The fill light 4 supplements light at a high level in the supplementary light timing 402 at the high level and closes supplementary light at the low level. The optical information collector 100 does not optimize the image data through the image signal processor 7. Therefore, only one frame of the previously collected image data remains in the storage area 13 of the image sensor 3. The optical information collector 100 discards the first frame of image data, and the dashed arrow in FIG. 7 represents the second frame of image data outputting to the decoding unit 8 for decoding. The decoding unit 8 receives and decodes the second frame of image data at time point g, at time point h, the second frame of image data is successfully decoded, and successfully decoded information is fed back to the central processor 5. Due to signal delay, at time point i, the image sensor 3 is controlled to stop collecting the image data and the fill light 4 is controlled to stop supplementing light. It should be noted that when the ambient light is sufficient, supplementary light is not necessary. According to the image data collection timing 403, it can be seen that at this time, the image sensor 3 has already collected six frames of image data, and the sixth frame of image data will remain in the storage area 13 of the image sensor 3. When the optical information collector 100 collects new optical information again upon triggering, the optical information collector 100 will discard the residual frame of image data in the image sensor 3 again and start decoding and outputting from the second frame of image data to avoid the decoding error.

In the above method, each time new optical information is collected, one or two frames of residual image data are discarded as needed, which can solve the problem of residual image data in the image sensor 3 or the image signal processor 7; in an implementation mode, residual data of two or more frames can also be discarded according to an actual need.

The above method has a certain drawback, that is, each time new optical information is collected, the image sensor 3 needs to output and discard one or more frames of residual image data, and decoding unit 8 starts decoding at least the second frame of image data, which wastes time. It can be imagined that if new optical information is collected each time, the first frame of image data outputted by the image sensor 3 is an effective image data (image data of new optical information), which can improve efficiency.

It can be imagined that if, after each successful decoding, the storage area 13 of the image sensor 3 or the register 14 of the image signal processor 7 are cleared, so that there is no residual image data information when new optical information is collected next time, the first frame of image data is the new optical information image data. Therefore, decoding can be directly started from the first frame of image data, thereby improving decoding speed. This can be achieved through a preset algorithm, the storage area 13 of the image sensor 3 or the register 14 of image signal processor 7 are continuing to clear after each successful decoding by algorithm controlling. The preset algorithm for clearing the storage area 13 of the image sensor 3 or the register 14 of the image signal processor 7 usually requires the algorithm to be preset by a manufacturer of the image sensor 3 or the manufacturer of the image signal processor 7 (or the manufacturer of central processor 5 integrated with image signal processor 7, the same below). For the manufacturer of the optical information collectors 100, the purchased image sensor 3 or image signal processor 7 typically has predefined operational logic for processing image data by the manufacturers of the image sensor 3 or the image signal processor 7, which is difficult to change. That is, when the manufacturer pre-defines, the image data stored in the image sensor 3 or the image signal processor 7 is not decoded, the last frame of image data is still stored in the image sensor 3 or the image signal processor 7. Thus, it is difficult for the manufacturer of the optical information collector 100 to modify or directly eliminate the residual image data in the image signal processor 7. Moreover, due to the different operation logic of the image sensor 3 produced by different image sensor 3 manufacturers, and the different image signal processors 7 produced by different image signal processors 7, there are also different operation logics. Even if the optical information collector 100 manufacturer can be debugged to directly eliminate the residual image data in the image sensor 3 or the image signal processor 7, after replacing the image sensor 3 or the image signal processor 7, re-debugging is required, and the work is huge. If there is a portable method to clear the residual image data in different models of image sensors 3 or image signal processors 7, it will save work.

Figure 8:
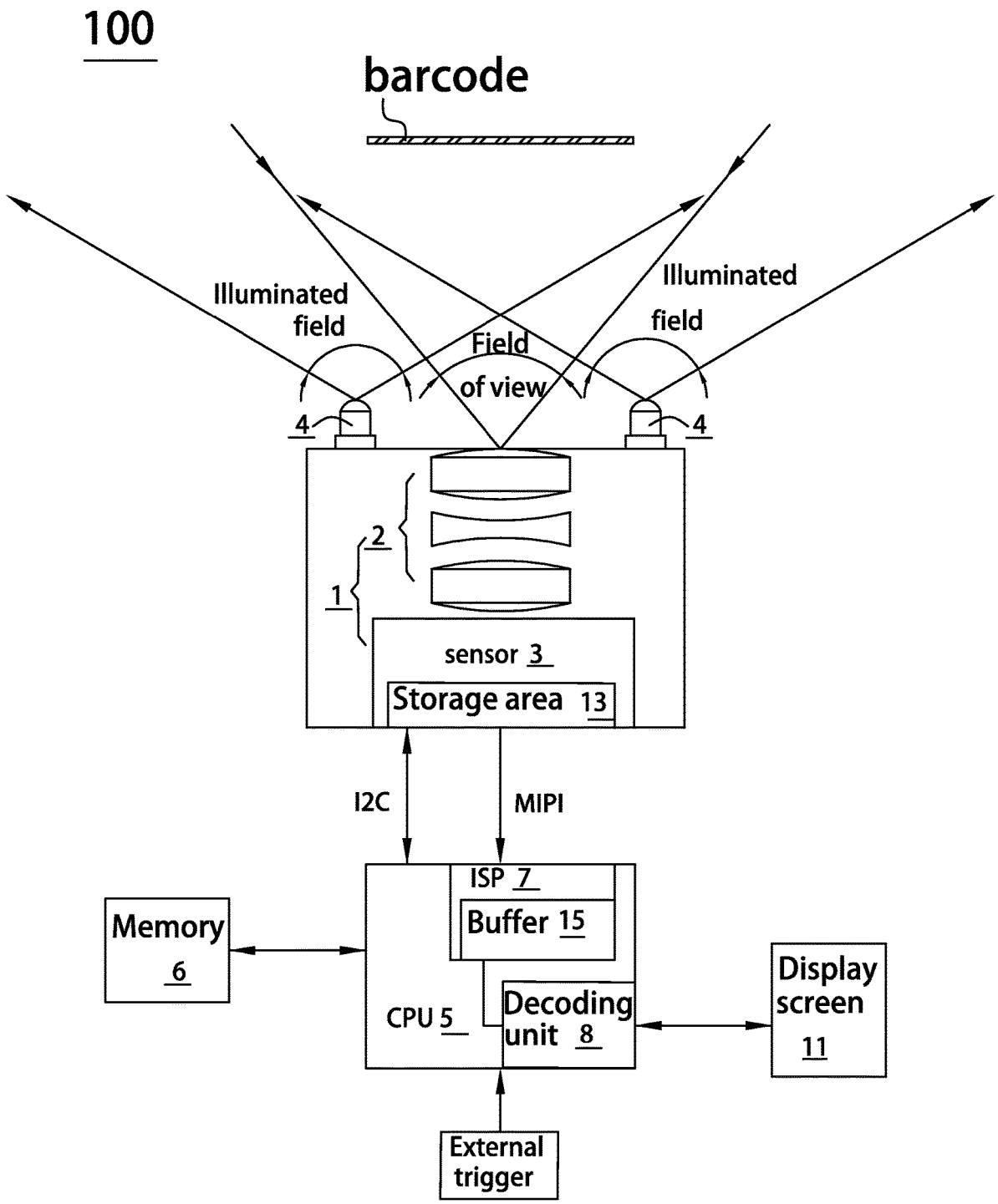
FIG. 8 is another block diagram of the optical information collector in another embodiment of the present application.

In a block diagram of an optional embodiment shown in FIG. 8, residual image data is eliminated by bypassing the image data processing flow predefined by the image signal processor 7 manufacturer. The optical information collector 100 does not optimize the image data through the image signal processor 7. The image data collected by the image sensor 3 is outputted to the image signal processor 7 through an existing MIPI interface and stored in a buffer 15 that can be separately configured by the optical information collector 100 manufacturer. The buffer 15 is integrated into the image signal processor 7, of course, the buffer 15 can also be provided independently of the image signal processor 7, and the decoding unit 8 retrieves image data from the buffer 15 and decodes it. In this embodiment, the image data collected by the image sensor 3 is still transmitted to the image signal processor 7 through the existing MIPI interface, and then to the decoding unit 8, because transmitting image data through the existing MIPI interface is relatively simple. In some embodiments, it is possible to completely bypass the image signal processor 7, that is, the image data collected by the image sensor 3 is directly transmitted to the decoding unit 8 for decoding. Since the image data is not optimized through the image signal processor 7, only one frame of image data remains in the storage area 13 of the image sensor 3. A specific process can be provided to eliminate the residual frame of image data in the image sensor 3.

In an optional embodiment, after the original decoding process is completed, for example, after the decoding is successful, the central processor 5 issues an end instruction to control the image sensor 3 to end collecting the image data. The central processor 5 then sends another instruction to the image sensor 3 again to control the image sensor 3 to continue collecting one or more frames of image data, preferably, colleting one frame of image data, and the image sensor 3 is controlled to continue outputting this frame of image data, so that the image data in the storage area 13 of the image sensor 3 is cleared, so that the first frame of image data outputted by the image sensor 3 for the next collection of new optical information is the image data of the new optical information. The last frame of image data outputted by the image sensor 3 can be inputted into the buffer 15 that can be configured by the optical information collector 100 manufacturer, further cleared, and the residual image data in the image sensor 3 is ultimately eliminated.

Figure 9:
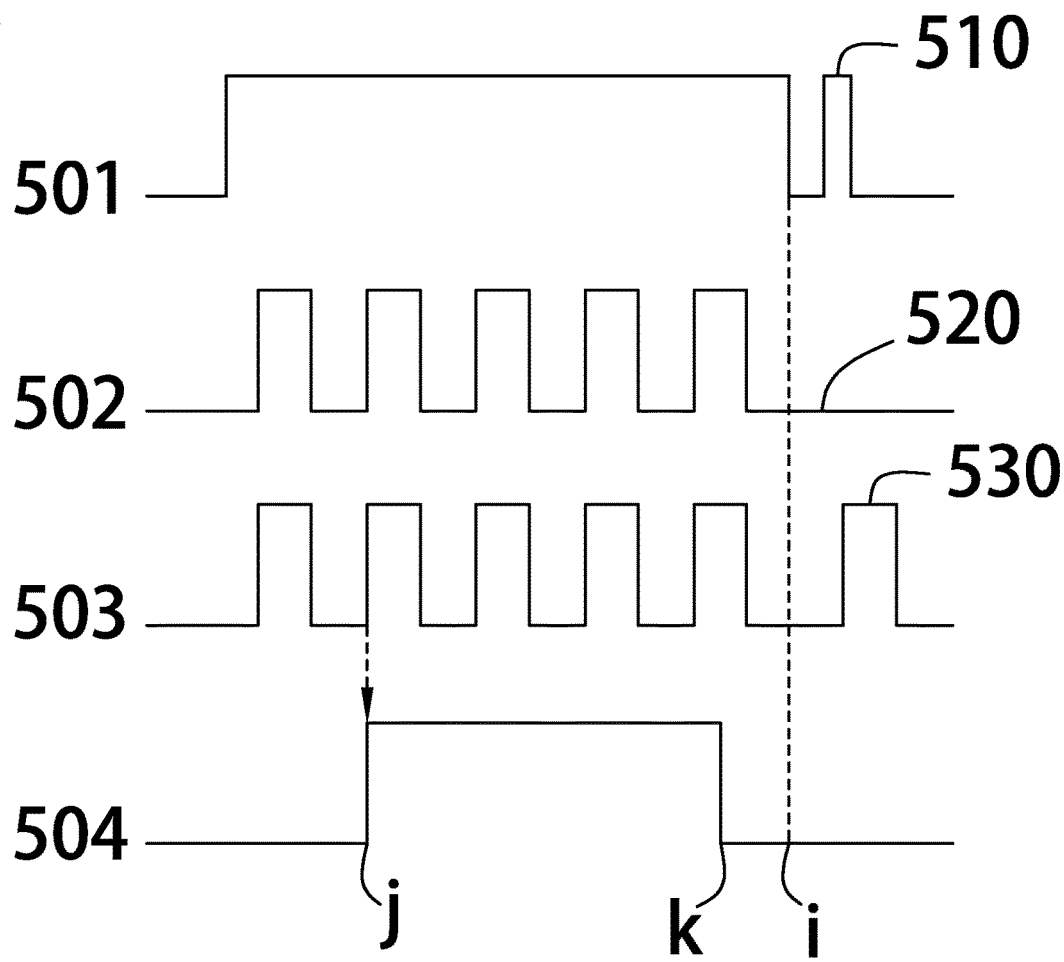
FIG. 9 is the timing diagram of the optical information collector collecting optical information in another embodiment of the present application.

Specifically, referring to the timing diagram 500 of one embodiment in FIG. 9, it illustrates the triggering signal 501 of the central processor 5, the supplementary light timing 502 of the fill light 4, the image data collection timing 503 of the image sensor 3 continuously collecting the image data, and the decoding timing 504 of the decoding unit 8. where, the triggering signal 501 triggers the image sensor 3 to collect the image data and the fill light 4 to supplement light at a high level, triggers the image sensor 3 to stop collecting the image data and the fill light 4 to stop supplementing light at a low level. The fill light 4 supplements light at the high level in the supplementary light timing 502 and closes supplementary light at the low level; the image data collection timing 503 of the image sensor 3 is synchronized with the supplementary light timing 502. The image sensor 3 exposes at the high level in the image data collection timing 503 and outputs the image data at the low level. The dashed arrow in FIG. 9 represents the first frame of image data outputting to the decoding unit 8 for decoding. The decoding unit 8 receives the first frame of image data at time point j, successfully decodes the first frame of image data at time point k, and feeds back successfully decoded information to the central processor 5. The central processor 5 sends a triggering signal at time point i to control the image sensor 3 to stop collecting the image data and control the fill light 4 to stop supplementing light. Unlike the previous embodiments, the central processor 5 will once again send a control signal 510 to separately control the image sensor 3 to continue collecting one frame of image data at the high level 530 and output this frame of image data. If there is no residual image data in the image sensor 3, a new collected optical information in next time upon triggering, the first frame of image data collected and outputted by the image sensor 3 is the image data of the new optical information, the decoding unit 8 can directly receive and decode the first frame of image data. At this time, the fill light 4 is at the low level 520 and does not supplement light, thereby saving power consumption. It should be noted that when the ambient light is sufficient, supplementary light is not necessary throughout an entire process.

In the aforementioned multiple embodiments, the image data is continuously collected and decoded in a digital streaming mode. When the decoding unit 8 successfully decodes the first frame of image data received, the image sensor 3 has already collected multiple frames of image data. For example, in the timing diagram 200, the image sensor 3 has collected a total of seven frames of image data. Obviously, collecting the second to seven frames of image data has caused waste of power consumption. At present, the optical information collector 100 produced by companies such as iData, Honeywell, and Zebra can be successfully decoded within the first three frames of image data, that is, at least one frame of the first three frames of image data collected by the image sensor 3 can be successfully decoded by the decoding unit 8. As can be seen from the above, when the optical information collector 100 successfully decodes the third frame of image data, the image sensor 3 has already collected more than three frames of image data, and even six or seven frames of image data have been collected. Collecting the fourth to seventh frames of image data also requires the image sensor 3 to work or the fill light 4 to supplement light. Since the fourth to seventh frames of image data are not used for decoding, the collecting the image data from the fourth to seventh frames resulted in wasted power consumption. It should be noted that in some embodiments, supplementary light is not necessary when the ambient light is sufficient. For example, in daily life, scanning codes with a mobile phone, and the supplementary light is usually not necessary.

In a preferred embodiment, the optical information collector 100 may collect image data in a fixed frame mode, the fixed frame mode is different from the continuous collection of image data in the digital stream mode. In the fixed frame mode, the central processor 5 controls the image sensor 3 to collect a fixed frame number of image data each time, and the decoding unit 8 decodes the fixed frame number of image data. When the decoding of the fixed frame number of image data collected in the previous time is completed (one frame of image data has been successfully decoded or all fixed frame number of image data has been decoded) or is about to be completed, the central processor 5 will then determine whether to collect the fixed frame number of image data again, and so on, until the decoding is successful or the decoding times out. There is a time interval between the collection of fixed frame number of image data before and after in the fixed frame mode, rather than continuous, which leaves time for the central processor 5 to make judgments.

Figure 10:
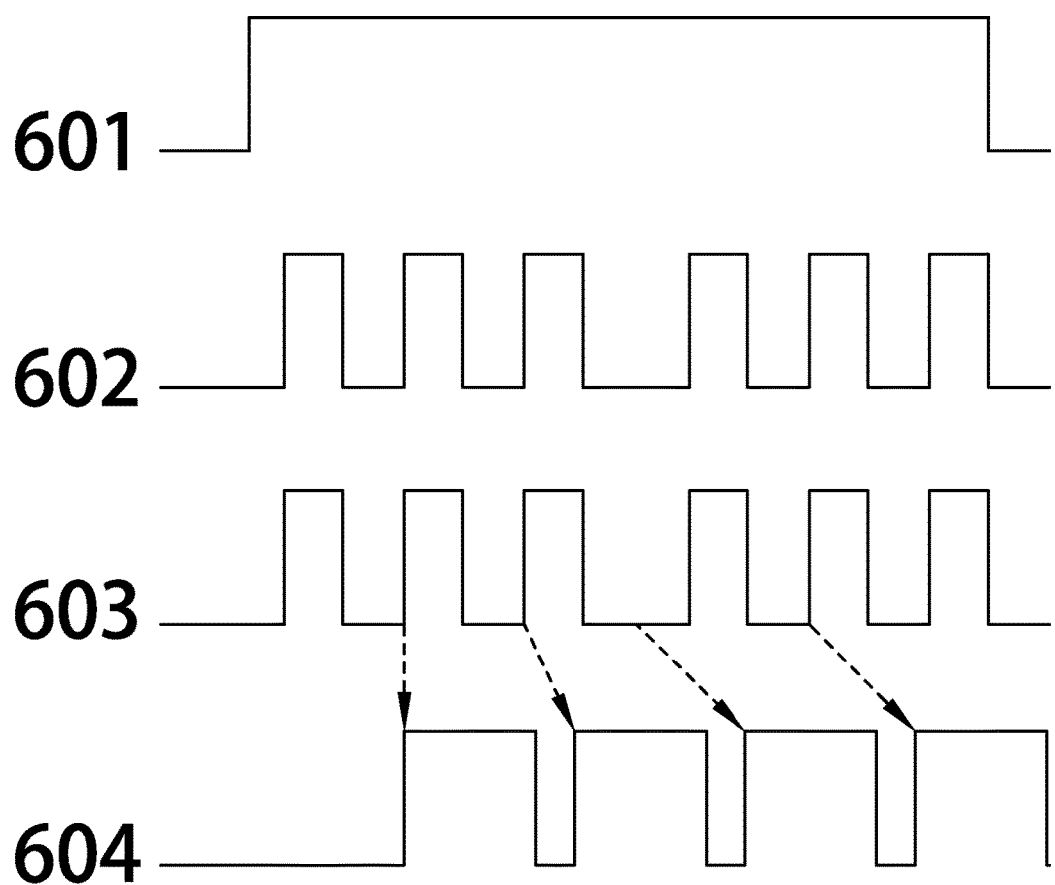
FIG. 10 is the timing diagram of the optical information collector collecting optical information in a fixed frame mode of another embodiment of the present application.

Referring to the timing diagram 600 of an embodiment in FIG. 10, it shows the triggering signal 601 of the central processor 5, the supplementary light timing 602 of the fill light 4, the image data collection timing 603 of the image sensor 3 continuously collecting the image data, and the decoding timing 604 of the decoding unit 8. Where, the triggering signal 601 triggers the image sensor 3 to collect the image data and the fill light 4 to supplement light at a high level, triggers the image sensor 601 to stop collecting the image data and the fill light 4 to stop supplementing light at a low level. The fill light 4 supplements light at the high level in the supplementary light timing 602 and closes supplementary light at the low level. The image data collection timing 603 of the image sensor 3 is synchronized with the supplementary light timing 602, and the image sensor 3 exposes at the high level of the image data collection timing 603 and outputs the image data at the low level. The four dashed arrows from left to right in FIG. 10 respectively represent the outputting of the first to fourth frame image data to the decoding unit 8 for decoding. The first to third frame of image data were not successfully decoded, while the fourth frame of image data was successfully decoded. From the image data collection timing 603, it can be seen that there is a clear time interval between the collection time of the first three fixed frame number of image data and the collection time of the last three fixed frame number of image data. This is used by the central processor 5 to determine whether the decoding of the first three fixed frame number of image data is complete, and thus to determine whether it is necessary to control the image sensor 3 to continue collecting the last three fixed frame number of image data.

Where, the image data collection timing 603 shows that the image sensor 3 collects the image data in a fixed frame mode with a fixed frame number of three frames. The central processor 5 controls the image sensor 3 to first collect three fixed frame number of image data and transmit these three frames of image data to the decoding unit 8. When these three frames of image data are not decoded successfully, the image sensor 3 is controlled to collect three frames of image data again and transmit it again to the decoding unit 8 for decoding, and so on, until decoding is successful (or decoding times out). From the timing diagram 600, it can be seen that when the fourth frame of image data collected by the image sensor 3 is successfully decoded, if the image sensor 3 has not collected a fixed frame of three frames of image data at this time, the image sensor 3 will continue to execute the fixed frame mode, collect the fixed frame number of image data, that is, continue to collect the fifth and sixth frame of image data, and output all the fixed frame of fifth and sixth frame of image data, then, stop image data collection, and there will be no residual image data in the image sensor 3. It is easy to understand that, on the contrary, it is also possible to control the image sensor 3 to stop image data collection after successful decoding, even if the image sensor 3 has not yet collected the fixed frame number of image data. This can save power to a certain extent, but it will cause residual image data in the image sensor 3. The residual image data in the image sensor 3 can be discarded when the next time new optical information is collected.

In the aforementioned embodiments, after decoding the first three frames of image data (successfully or not), the image sensor 3 is controlled to collect three frames of image data. There is a time interval between the collection of the first three frames of image data. If the fixed frame number of image data of the first three frames is not decoded successfully, there will be a significant delay in collecting the fixed frame number of image data of the last three frames. As an improvement, it is optional to control the image sensor 3 to collect three more frames of image data when the second frame of image data from the first three frames is not successfully decoded or when the third frame of image data is inputted to the decoding unit 8 for decoding so as to achieve a balance between decoding speed and power consumption. The time for collecting the last three frames of image data can be determined according to an actual need, so that there is no significant delay between the collection of the first and last three frames of image data.

In the aforementioned embodiments, the fixed frame number in the fixed frame mode is three frames, that is, the image sensor 3 collects three frames of image data each time. In some embodiments, a fixed frame number can be determined based on a performance of the specific optical information collector 100. For example, if the optical information collector 100 can achieve decoding within the first two frames of image data or the first frame of image data is successfully decoded, the fixed frame number in the fixed frame mode can be set to two or one frame first to avoid power waste caused by subsequent multiple image data collection. After decoding the image data in this frame, and the decoding is not successful, the image sensor 3 is controlled to collect the next frame of image data. Of course, the fixed frame number can also be set to two, four, five, or more frames. In summary, based on the previous embodiment, it can be seen that the current optical information collector 100 can be successfully decoded in the first three frames of image data, and the fixed frame number needs to be less than or equal to the timeout time of decoding unit 8 for decoding one frame of image data. Under an existing technical condition, the timeout time is usually set to 100 ms, which means that the decoding unit 8 takes 100 ms to decode one frame of image data and does not successfully decode, stops decoding this frame of image data and decodes a next frame of image data. Therefore, the fixed frame number in fixed frame mode is preferably no more than five frames (20 ms*5=100 ms), and further preferably, three to five frames, so that the fixed frame number of image data collected in the first fixed frame mode can be decoded successfully without collecting too much image data, which has a power consumption advantage compared to the existing digital stream mode. It can be imagined that when the specific optical information collector 100 needs more than five frames of image data in the digital stream mode to decode successfully, the fixed frame number can be set to five frames or more.

A hybrid mode that combines the advantages of fixed frame mode and digital stream mode can be adopted to adapt to complex application scenarios and achieve a balance between power consumption and decoding speed. For some difficult to recognize optical information, such as a high-density QR code, a DPM (Direct Part Mark), or a complex text symbol, the fixed frame mode can be used to collect and decode the image data first. If decoding is not successful, the digital stream mode can be used to continuously collect the image data for decoding. It can be imagined that this hybrid mode can also be used for the recognition of simple optical information.

It is easy to imagine that hybrid mode can have multiple arrangements and combinations.

Figure 11:
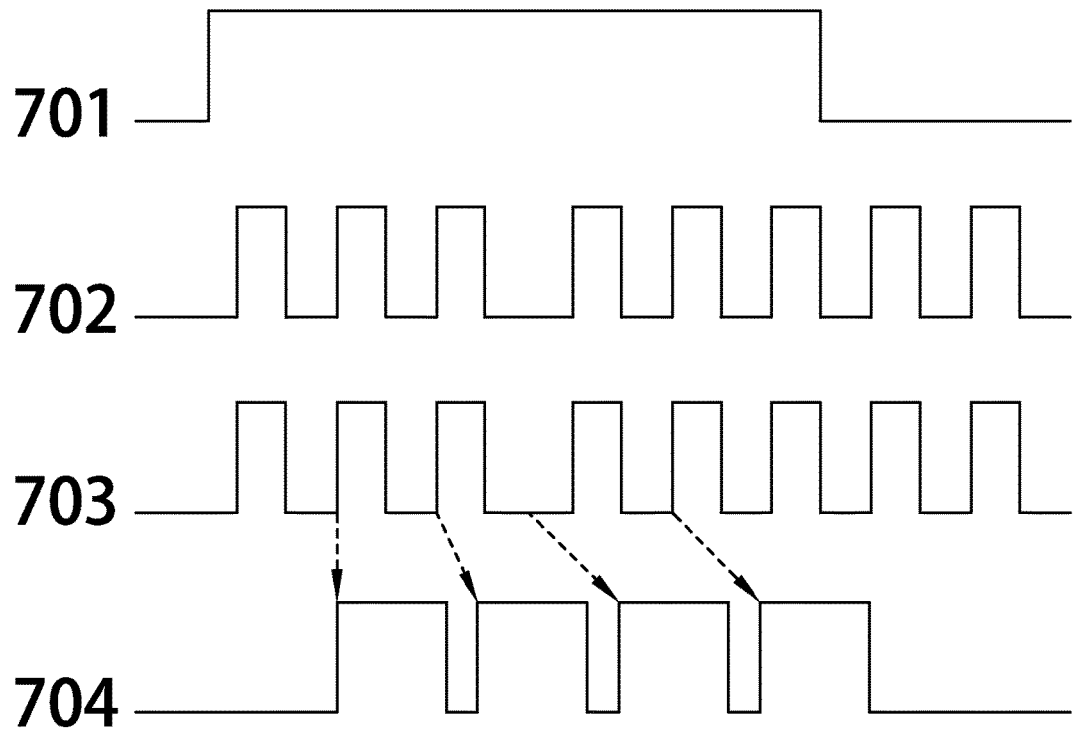
FIG. 11 is the timing diagram of the optical information collector collecting optical information in a hybrid mode of another embodiment of the present application.

For example, the camera 1 can be configured to first collect the image data in the fixed frame mode with a preset number of times, and then collect the image data in the digital stream mode. For example, the fixed frame mode is first used to collect fixed frame number of image data, and then the digital stream mode is used to continuously collect the image data, as shown in the timing diagram 700 in FIG. 11, it illustrates the triggering signal 701 of the central processor 5, the supplementary light timing 702 of the fill light 4, the image data collection timing 703 of the image sensor 3 continuously collecting the image data, and the decoding timing 704 of the decoding unit 8. The optical information collector 100 first uses a fixed frame number of three frames to collect three frames of image data. If decoding is not successful, the digital stream mode is used to continuously collect and decode the image data. The decoding unit 8 successfully decodes the first frame of image data collected in the digital stream mode.

In other embodiments, the fixed frame mode can be used multiple times first. If the decoding is not successful, the digital stream mode can be used. For example, the fixed frame mode can be used twice first, and then the digital stream mode can be used. That is, the fixed frame number of three frames of image data can be collected first for decoding. If the decoding is not successful, the fixed frame number of three frames of image data can be collected again for decoding, and if the decoding is not successful yet, then the digital stream mode is used for decoding. It can be imagined that the fixed frame mode of three or more times can be used for decoding first. If decoding is not successful, then the digital stream mode can be used for decoding.

As previously described, when the digital stream mode is used for decoding, image data will remain in the image sensor 3 when decoding is successful. To solve this problem, the hybrid mode can be to first use the fixed frame mode, then use the digital stream mode, and finally end with the fixed frame mode.

Figure 12:
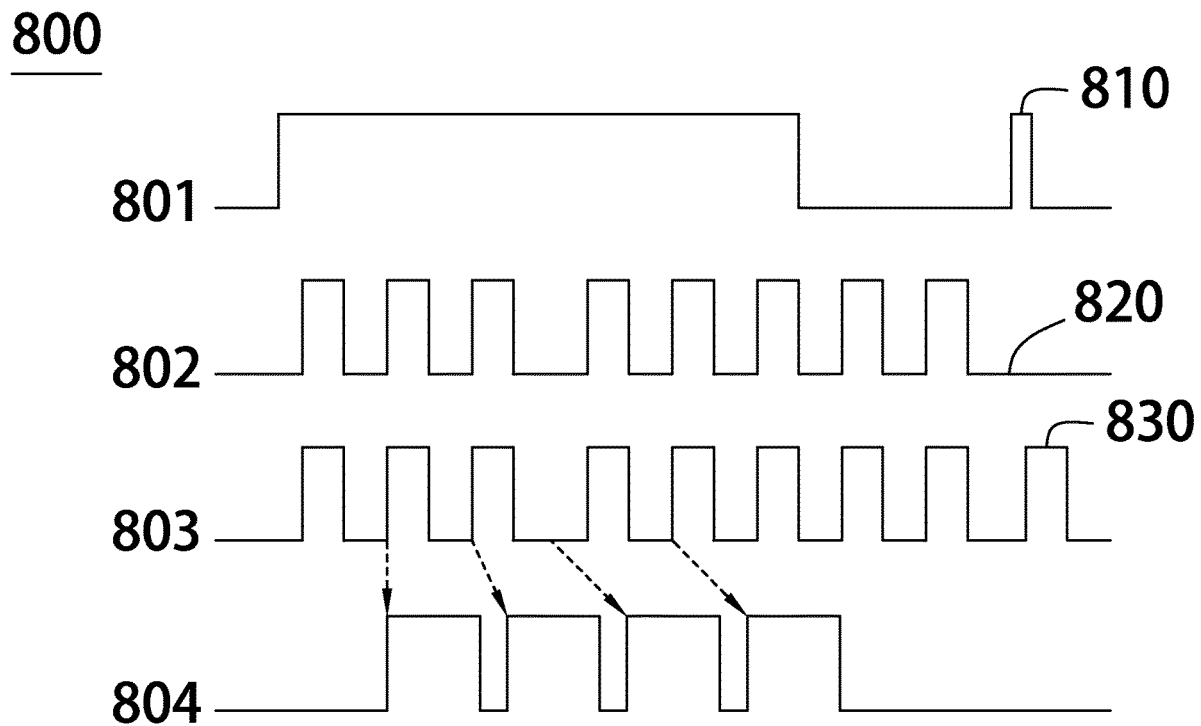
FIG. 12 is the timing diagram of the optical information collector collecting optical information in another hybrid mode of another embodiment of the present application.

Specifically, referring to the timing diagram 800 of one embodiment in FIG. 12, it shows the triggering signal 801 of the central processor 5, the supplementary light timing 802 of the fill light 4, the image data collection timing 803 of the image sensor 3 continuously collecting the image data, and the decoding timing 804 of the decoding unit 8. The optical information collector 100 first collects three frames of image data using the fixed frame mode with a fixed frame number of three frames. When decoding is not successful; then, the digital stream mode is used to continuously collect and decode the image data. The decoding unit 8 successfully decodes the first frame of image data collected in the digital stream mode, and when the decoding unit 8 successfully decodes the fourth frame of image data, the image sensor 3 is controlled to stop collecting the image data and the fill light 4 is controlled to stop supplementing light. Unlike the previous embodiments, the central processor 5 will once again send a control signal 810 to separately control the image sensor 3 to continue collecting one frame of image data at a high level 830 and output this frame of image data. Therefore, there is no residual image data in the image sensor 3. Moreover, since the image signal processor 7 is bypassed, there is no residual image data in the image signal processor 7. Once triggered again, new optical information will be collected, the first frame of image data collected and outputted by the image sensor 3 is new optical information image data, and the decoding unit 8 can directly receive and decode the first frame of image data. At this point, the fill light 4 is at low level 820 and does not supplement light, thereby saving power consumption. It should be noted that when the ambient light is sufficient, supplementary light is not necessary throughout the entire process.

It can be imagined that the hybrid mode can also first use the digital stream mode for image data collection and decoding. After the decoding is successful, the fixed frame mode is then used to control the image sensor 3 to continue collecting fixed frame number of image data, and the image sensor 3 is controlled to output all fixed frame number of image data. Therefore, there is no residual image data in the image sensor 3. In the aforementioned embodiments, a special case has been described, where after the decoding is successful in the digital stream mode, the image sensor 3 continues to collect one frame of image data.

It can be imagined that when the optical information collector 100 adopts a hybrid mode to collect the image data, the optical information collector 100 can optimize the image data through the image signal processor 7. In order to eliminate residual image data in the image signal processor 7, the aforementioned method of discarding residual image data with a specific frame number N can be further adopted. The specific frame number N discarded can be determined based on the residual image data. For example, when both the image sensor 3 and the image signal processor 7 store residual image data, two frames of image data need to be discarded each time when recollecting the image data. When there is no residual image data in the image sensor 3, and there is one frame of image data remaining in the image signal processor 7, each time the image data is re-collected, only one frame of image data remaining in the image signal processor 7 needs to be discarded. Alternatively, the optical information collector 100 may not process the image data through the image signal processor 7. If there is one frame of residual image data in the image sensor 3, each time a new image data is collected, only this frame of residual image data needs to be discarded. When in the hybrid mode and the fixed frame mode is used at the end, there is no residual image data in the image sensor 3, each time the image data is re-collected, there is no need to discard the residual image data.

The optical information collector and a method thereof of the present application have the following beneficial effects.

1. When the image sensor 3 collects the image data upon triggering, the central processor 5 issues an instruction to discard N frames of image data in a specific frame number. The N frames of image data in a specific frame number are the image data that was previously collected and remaining upon triggering so as to avoid the residual image data to be decoded and outputted and to cause a decoding error. At the same time, there is no need to decode the residual image data, thereby saving power consumption.
2. The image sensor 3 collects and outputs a fixed frame number of image data in a fixed frame mode each time. Compared to an existing continuous collection and outputting image data through a digital stream mode, it can save power and avoid continuous collecting the image data in the digital stream mode. When the decoding is successful, subsequent continuous collection of multiple frames of image data is not used for decoding, which results in waste of power consumption.
3. The image sensor 3 collects the image data in the digital stream mode and does not optimize the image data through the image signal processor 7 to avoid residual image data in the image signal processor 7; and in case of successful decoding or the decoding times out, the image sensor 3 is controlled to stop continuously collecting the image data in the digital stream mode, and the image sensor 3 is controlled to continue collecting and outputting the fixed frame number of image data, thereby avoiding residual image data in the image sensor 3, avoiding the decoding error in the next collection of optical information, and improving efficiency.

The above detailed explanation is only an explanation of the preferred embodiments of the present application and does not limit the scope of the present application. Therefore, any equivalent technical changes made by using the content of the present specification and illustrations are included in the scope of the present application.

What is claimed is:

1. An optical information collector, comprising:
   an image sensor, configured to collect image data of optical information;
   a memory, configured to preset with one or more decoding algorithms;
   a decoding unit, configured to decode the image data based on a preset decoding algorithm;
   a central processor, configured to control the image sensor to continuously collect the image data in a digital stream mode and control the decoding unit to decode the image data upon triggering, wherein once triggered, the central processor issues an instruction to discard a specific frame number of image data, wherein the specific frame number of image data is the image data that was previously collected and remaining in the optical information collector upon triggering.

2. The optical information collector as claimed in claim 1, wherein the specific frame number of image data comprises residual image data in a storage area of the image sensor.

3. The optical information collector as claimed in claim 1, further comprising:
an image signal processor, configured to receive the image data collected by the image sensor and transmit the image data to the decoding unit, wherein the specific frame number of image data comprises residual image data in the image signal processor.

4. The optical information collector as claimed in claim 1, wherein the discarding the specific frame number of image data comprises:
the decoding unit does not receive the specific frame number of image data, or the decoding unit does not decode the specific frame number of image data, or the decoding unit does not output or display decoding information of the specific frame number of image data.

5. The optical information collector as claimed in claim 1, wherein the decoding unit starts decoding from N+1st frame of image data.

6. An optical information collector, comprising:
an image sensor, configured to collect image data of optical information;
a memory, configured to preset with one or more decoding algorithms;
a decoding unit, configured to receive and decode the image data;
a central processor, configured to control the image sensor to continuously collect the image data in a digital stream mode and control the decoding unit to sequentially decode the image data; wherein the central processor is configured to control the image sensor to stop continuously collecting the image data in the digital stream mode and control the image sensor to continue collecting and outputting a fixed frame number of image data in a fixed frame mode when the decoding unit decodes successfully or a decoding times out.

7. The optical information collector as claimed in claim 6, wherein the fixed frame mode comprises: the image sensor will continue to collect the fixed frame number of image data and output the fixed frame number of image data when the decoding unit decodes successfully or decoding times out.

8. The optical information collector as claimed in claim 6, wherein the optical information collector does not have an image signal processor or does not optimize the image data through the image signal processor.

9. The optical information collector as claimed in claim 6, wherein the image sensor outputs image data in RAW format, the decoding unit obtains image data in grayscale based on the image data in RAW format and decodes based on the image data in grayscale.

10. The optical information collector as claimed in claim 6, wherein before the image sensor continuously collects the image data in the digital stream mode, the image sensor collects and outputs the fixed frame number of image data in a fixed frame mode.

11. An optical information collection method, comprising:
controlling an image sensor to continuously collect and output image data in a digital stream mode by a central processor;
receiving and decoding the image data by a decoding unit;
controlling the image sensor to stop collecting the image data in the digital stream mode when the decoding unit decodes successfully;
controlling the image sensor to continue collecting and outputting a fixed frame number of image data.

12. The optical information collection method as claimed in claim 11, wherein the fixed frame mode comprises: the image sensor will continue to collect the fixed frame number of image data and output the fixed frame number of image data when the decoding unit decodes successfully or decoding times out.

13. The optical information collection method as claimed in claim 11, wherein the optical information collector does not have an image signal processor or does not optimize the image data through the image signal processor.

14. The optical information collection method as claimed in claim 11, wherein the image sensor outputs image data in RAW format, the decoding unit obtains image data in grayscale based on the image data in RAW format and decodes based on the image data in grayscale.

15. The optical information collection method as claimed in claim 11, further comprising:
collecting and outputting the fixed frame number of image data in a fixed frame mode before the image sensor continuously collects the image data in a digital stream mode.

\* \* \* \* \*